Inventors
E.P.G. WRIGHT, W.F. GOULD,
T.F.S. HARGREAVES,
W.J. REYNOLDS
BY Robert Harding Jr.
Attorney

CARRIER TELEPHONE SYSTEM AND SUPERVISORY SIGNALING ARRANGEMENT THEREFOR

Filed July 17, 1947

Inventors
Edmund Philip Goodwin Wright
William Frederick Gould
Thomas Frederick Stanley Hargreaves
William John Reynolds
By Robert Harding Jr.
Attorney Inventors
Esmond Philip Goodwin Wright
William Frederick Lloyd
Thomas Frederick Stanley Hargreaves
By William John Reynolds
Robert Harding Jr.
Attorney Jan. 6, 1953 E. P. G. WRIGHT ET AL 2,624,806

CARRIER TELEPHONE SYSTEM AND SUPERVISORY SIGNALING ARRANGEMENT THEREFOR

Filed July 17, 1947 7 Sheets-Sheet 4

Inventors
Edmund Philip Goodwin Wright
William Frederick Gould
Thomas Frederick Stanley Hargreaves
By William John Reynolds
Robert Harding Jr.
Attorney (Part of Pyramid has been omitted)

Column of 32 tubes

Column of 64 tubes

Inventors
Edmund Philip Goodwin Wright
William Frederick Gould
Thomas Frederick Stanley Hargreaves
William John Reynolds
By Robert Harding Jr.
Attorney Jan. 6, 1953 E. P. G. WRIGHT ET AL 2,624,806

CARRIER TELEPHONE SYSTEM AND SUPERVISORY SIGNALING ARRANGEMENT THEREFOR

Filed July 17, 1947 7 Sheets-Sheet 6

Inventors
E.P.G. WRIGHT,
W. F. GOULD,
T.F.S. HARGREAVES,
W.J. REYNOLDS
BY Robert Harding Jr. Attorney Jan. 6, 1953 E. P. G. WRIGHT ET AL 2,624,806

CARRIER TELEPHONE SYSTEM AND SUPERVISORY SIGNALING ARRANGEMENT THEREFOR

Filed July 17, 1947 7 Sheets-Sheet 7

INVENTOR.

ESMOND PHILIP GOODWIN WRIGHT
WILLIAM FREDERICK GOULD
THOMAS FREDERICK STANLEY HARGREAVES
WILLIAM JOHN REYNOLDS

BY Robert Harding Jr.
ATTORNEY

Patented Jan. 6, 1953 2,624,806

UNITED STATES PATENT OFFICE 2,624,806

CARRIER TELEPHONE SYSTEM AND SUPERVISORY SIGNALING ARRANGEMENT THEREFOR

Esmond Philip Goodwin Wright, William Frederick Gould, Thomas Frederick Stanley Hargreaves, and William John Reynolds, London, England, assignors to International Standard Electric Corporation, New York, N. Y.

Application July 17, 1947, Serial No. 761,646
In Great Britain April 15, 1946

Section 1, Public Law 690, August 8, 1946
Patent expires April 15, 1966

8 Claims. (Cl. 179—15)

This invention relates to signalling in telephone systems and has for its object the provision of an economical, yet reliable signalling technique, which, while capable of general application, is particularly useful for signalling on coaxial circuits and makes such circuits an economical proposition over distances as low as of the order of 50 miles.

It has previously been proposed to use independent signal channels associated individually with speech channels. Thus, the paper by W. G. Radley and E. P. G. Wright entitled "Voice Frequency Signalling and Dialling in Long Distance Telephony" read before the Institution of Electrical Engineers on December 18, 1941, makes the following suggestions:

"Suggestions have been made that signalling channels suitable for use with multi-circuit carrier telephone systems could be provided by means similar to those employed in voice-frequency telegraphy. The proposed schemes envisage the allocation of one speech channel from a group to provide signalling facilities for the remainder of the group, the allocated speech channel being subdivided by filters to give the appropriate number of signalling channels in the same way as a 12- or 18-channel voice-frequency telegraph system is obtained by subdivision of a speech channel into bands, each having a width of 120 C./S. In order that the complete system should be flexible, it is not desirable that the signalling channels appropriate to more than one, or at the most two, groups of 12 speech channels should be associated. A convenient scheme would be for one speech channel in each 12-channel group to be allocated for signalling and to be subdivided so that it provides signalling facilities for the other 11. Alternatively, the selected speech channel could be subdivided to provide many more signalling channels, but with such subdivision, or with cheapened filters, the frequency bandwidth included in each channel would be insufficient for the transmission of dialling impulses without the introduction of distortion exceeding permissible limits. Dialling impulses could however, be transmitted either over the speech circuit, which is not required for conversation during dialling, or over separate dialling channels which are connected to the circuit only when required. The band-width required for each individual channel to provide signalling facilities other than dialling could be reduced since considerable distortion can be permitted to these signals. Apart from the reduced flexibility of such a system, the reduction in cost of the individual signalling channels would probably more than compensate for the additional complication.

"Independent channels are used for the two directions of transmission, and signalling can take place independently and, if necessary simultaneously in both directions. Signalling is possible during the periods when speech is also being transmitted, and the signalling system is entirely free from interference due to speech currents."

According to the main feature of the present invention a signal path is associated in common with a group of speech paths, each signal being accompanied by signals characteristic of the identity of the speech path to which it belongs.

It is preferably proposed to use a signal path as a channel for signals in one direction only in which case two signal channels would be used for signals in opposite directions.

The signal channels may be used only for incoming signals relating to the speech channels, or for both incoming signals and outgoing signals, though it is preferable even in the latter case to transmit selective signals over the speech channel. When both incoming and outgoing signals are sent over the signal channels, a channel will carry incoming signals for, e. g. E–W calls and outgoing signals for W–E calls.

In order to make the utmost use of line plant, it is proposed to use a narrow frequency band, in what would normally be a speech band for code signalling, preferably the upper end of the speech band although a narrow channel within or at the lower end of the speech band could be used.

The normal speech band can then provide two channels, a slightly degraded speech channel and a signal channel.

The system is well adapted for use in carrier systems, each one-way channel of one of a group of duplex carrier speech paths providing a one-way signal channel common to the one-way channels of the group of duplex carrier speech paths.

At the incoming end of a four-wire duplex carrier band providing speech and signalling channels, demodulation takes place after which the low frequency currents pass to two filters in parallel, a low pass filter for separating out the speech channel and a band pass filter separating out the signal channel. The low pass filter leads to the four-wire termination of the duplex carrier band while the band-pass filter leads to a signal receiving circuit.

Similarly, the outgoing end of such a band receives speech currents via the four-wire terminating set and a low-pass filter and receives signal currents from a signal sender and a band-pass filter, the two sets of currents then passing through the same series of modulators.

It will be noted that the term "channel" is used strictly within the meaning defined in the British Standards Institute Glossary of Terms used in Telecommunication: B. S. 204: 1943, that is, "a means of one-way communication," and that a means of two-way communication, that is the path for a two-way conversation, is referred to as a "duplex path," the term "path" being held to cover both a channel and a duplex path.

The carrier grouping used by the British Post Office is as follows:

The basic group consists of twelve pairs of channels, each related pair of outgoing and incoming channels (constituting a duplex path) being allotted a carrier band-width of 4 kc. in the range 60–108 kc.

Five basic groups constitute a super-group and a single super-group is allocated a band width of 4 kc.×12×5=240 kc.

A complete coaxial system comprises 480 channels in 8 super-groups having the ranges 60–300 kc., 312–552 kc., 560–800 kc., 808–1048 kc.

Speech is first modulated to a frequency band capable of being handled by a crystal filter, filtered and then modulated to a basic group channel, e. g. 80–84 kc. The modulated basic channel frequency band is then, in all cases, modulated to a particular channel in the group 312–552 kc. and, if the 312–552 kc. group is not actually to be used, further modulated to a particular channel in another super-group.

It is proposed to allocate one outgoing and one incoming signal channel to a super-group, and as previously stated, it is proposed to split one frequency band normally allocated for speech to provide a degraded speech channel of 0.3–2.9 kc., and a signal channel of 3.3 to 3.5 kc. width: that is, a signal frequency band of 200 cycles.

Of course, a complete 4 kc. band could be reserved entirely for signalling, but it is more economical to take advantage of the fact that only a 200 cycle band is required for signalling, and to utilise the band for a speech channel and a signalling channel.

When the signal channels are used for incoming signals only, outgoing supervisory signals will be of 750 C. P. S. over the speech channels, while incoming signals will be initiated at 3,300 C. P. S.

It is normal practice within a super-group, say from London to Brighton, to allocate a specific number of duplex paths for calls in one direction and the remainder for calls in the other direction according to traffic requirements. The maximum allocation in one direction is of the order of 40 duplex paths for which therefore, the direction of incoming signals will be constant. In the limit therefore, one signal channel would be used for incoming signals on forty duplex speech paths while the other channel would be used for incoming signals on the other twenty paths.

It is proposed to use three incoming signals during a call: proceed to dial. answer, and clear. In order to differentiate between each different signal for each different speech channel it is proposed to signal by means of a 9-unit, 10-unit, or 11-unit telegraph code. Such a code may have 7 or more effective signalling units, six of them for channel identification. giving $2^6=64$ different signals which is sufficient to identify the particular duplex speech path (of 40), and one or more units for signal transmission. In addition, there would be a start unit and one or two stop units. The use of a channel for signalling in one direction only by teleprinter signals is called "half-telegraph" signalling or simplex operation.

Six units can be used for indicating duplex speech path identity, and the seventh to indicate the circuit condition: the same signal can be used for two of the three conditions, e. g. proceed to dial and answering supervisory or backward clear signal, so that simple mark and space signals will suffice. Alternatively, two or more signal units can be provided.

Circuits for such a system are shown in the accompanying drawings in which:

Fig. 1 is a schematic diagram of the system as a whole;

Figs. 2A and 2B show the relevant portion of an incoming relay set I. R. S., Fig. 1, adapted to initiate transmission of incoming signals over the signal channel. Fig. 2B should be placed to the right of Fig. 2A.

Figs. 3A and 3B show the half-telegraph signal sender SS, Fig. 1, associated by a switch CS, with the incoming relay sets I. R. S., Figs. 2A and 2B. Fig. 3B should be placed to the right of Fig. 3A.

Figs. 4A and 4B show the half-telegraph signal receiver SR, Fig. 1. Fig. 4B should be placed to the right of Fig. 4A.

Fig. 5 shows the voice frequency oscillator for 750 C. P. S. outgoing signals.

Fig. 6 shows the voice frequency signal receiver for 750 C. P. S. outgoing signals.

Fig. 7 shows the incoming signal oscillator modulator; while

Figure 1:
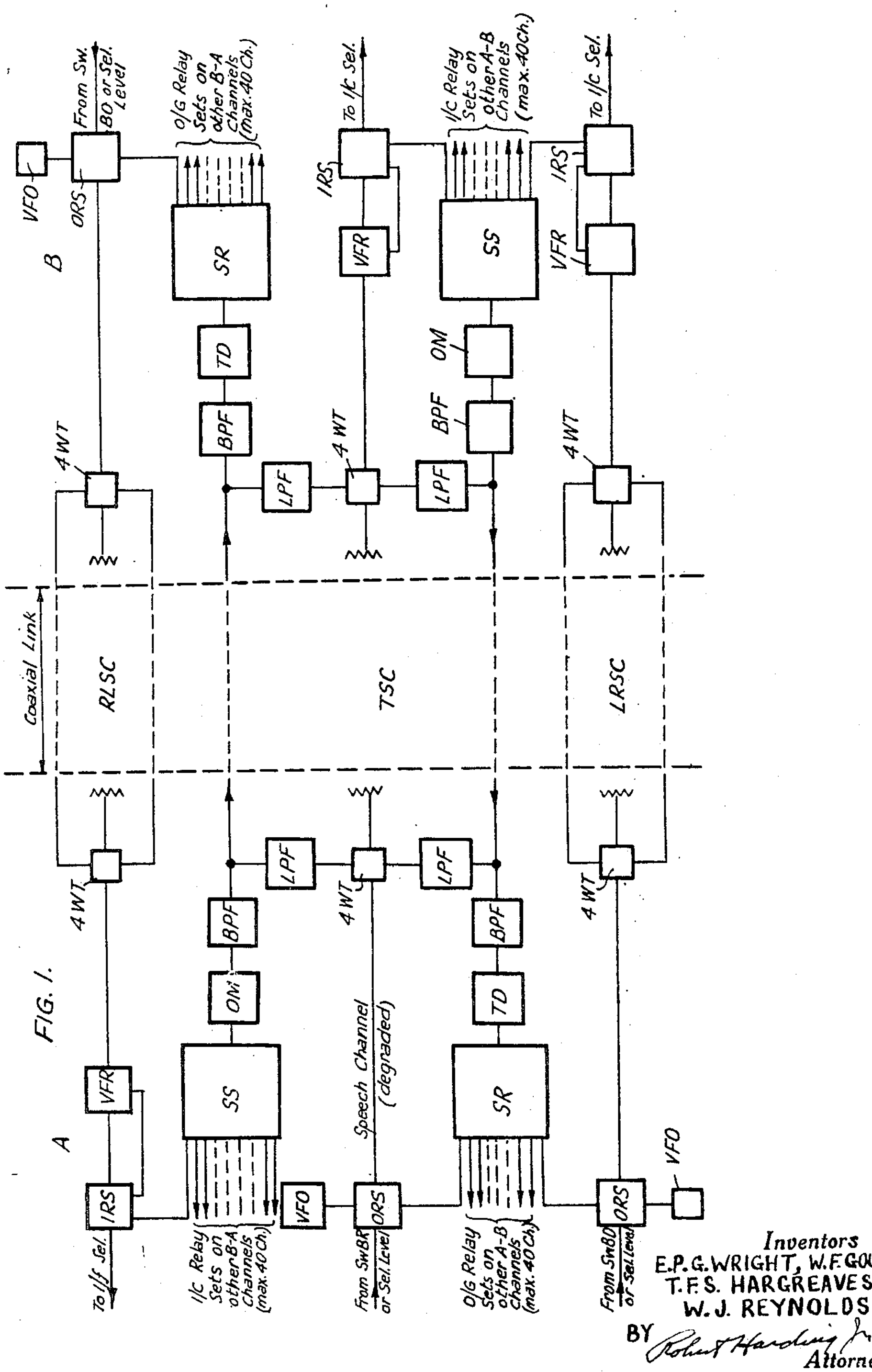

Referring first to Fig. 1, RLSC and LRSC each indicate the outgoing and incoming speech channels of a duplex carrier speech path in a coaxial link between terminal points A. B. RLSC is allocated to calls from B to A and LRSC to calls from A to B. TSC is the duplex carrier path used both by the signal channels and the degraded speech channels. In order to use standard modulating and demodulating equipment, the degraded speech channel and the signal channel in each direction are dealt with as a normal 4 kc. frequency band.

Each duplex path is provided at the outgoing end with an outgoing relay set ORS, to which there is access from the local switchboard or outgoing selectors, e. g. at A, and which is associated with a 750 C. P. S. V. F. oscillator VFO. The outgoing relay set is connected to the four-wire terminating set 4WT of a duplex path, e. g. LRSC which also terminates at its incoming end on a 4-wire terminating set 4WT connected to a V. F. receiver VFR associated with an incoming relay set IRS having access to the local incoming selectors, e. g. at B.

Outgoing signalling takes place by V. F. pulses over the speech channels.

For incoming signalling all incoming and outgoing relay sets are connected respectively to signal senders and receivers associated respectively with an oscillator modulator OM for 3300 C. P. S. together with a band pass filter BPF, and with a band pass filter BPF followed by a telegraph detector TD.

It will be understood that system modulating and demodulating equipment is provided on the outgoing and incoming ends of the coaxial link.

The code signals are preferably a series of 9 or 10 marks and spaces of signalling frequency.

While the duplex speech paths would normally be allocated to a particular direction of working, a small proportion may be allocated for both-way working in which case each end of paths so allocated, would be provided with both incoming and outgoing relay sets and would present themselves to both signal channels as if allocated for unidirectional working.

In one signalling arrangement, it is proposed to provide two different signals only on each signal channel. For this purpose a 7 unit teleprinter type code will be used. Six units define the channel and the seventh indicates the signal. The transmitted code will be ten units including a one-unit start and two-unit stop signal, each unit being either mark or space hereinafter designated by "M" for mark and "S" for space.

All outgoing signals will be sent over the speech channels by means of V. F. using one frequency only, preferably 750 C. P. S. as follows:

Call—short pulse (80 ms.)
Dial—10 I. P. S. pulses
Release—long pulse (1.5 seconds in answered call, 4.5 seconds in unanswered call).

A limiting tube will be used at the outgoing end to prevent false dialling due to speech. This will be disconnected by the answer signal which will also introduce voice immunity conditions at the outgoing end, so that speech will not produce V. F. signals.

Incoming signals for busy, ring-back and dead number indications will be the tone indications commonly used for this purpose. The number unobtainable tone will be interrupted 1 second in 5 in order that the release signal can break through. The proceed to dial signal can be a suitable tone or preferably a signal can be transmitted on the signal channel.

The two signals available on the signal channels will be referred to as the "A" and "B" signals. They are indicated by the seventh code unit, being either mark or space. Their function can be as follows:

"A" signal—"Answer."
"B" signal—"Proceed to Dial" and "Backward Clear."

In the signal arrangement shown in the drawings, four signals are available but it will be obvious that more or less signals can be provided as required on the channel.

In the system shown in Figs. 2A—2B, 3A—3B, 4A—4B, signals are sent by means of a 1+8+2 unit teleprinter code. Six of the eight units are used to identify the speech path and the other two to identify one of four signals which will be referred to the A, B, C or D signals. The signals code is:

A signal—S S
B signal—S M
C signal—M S
D signal—M M

Figures 2A, 3A:
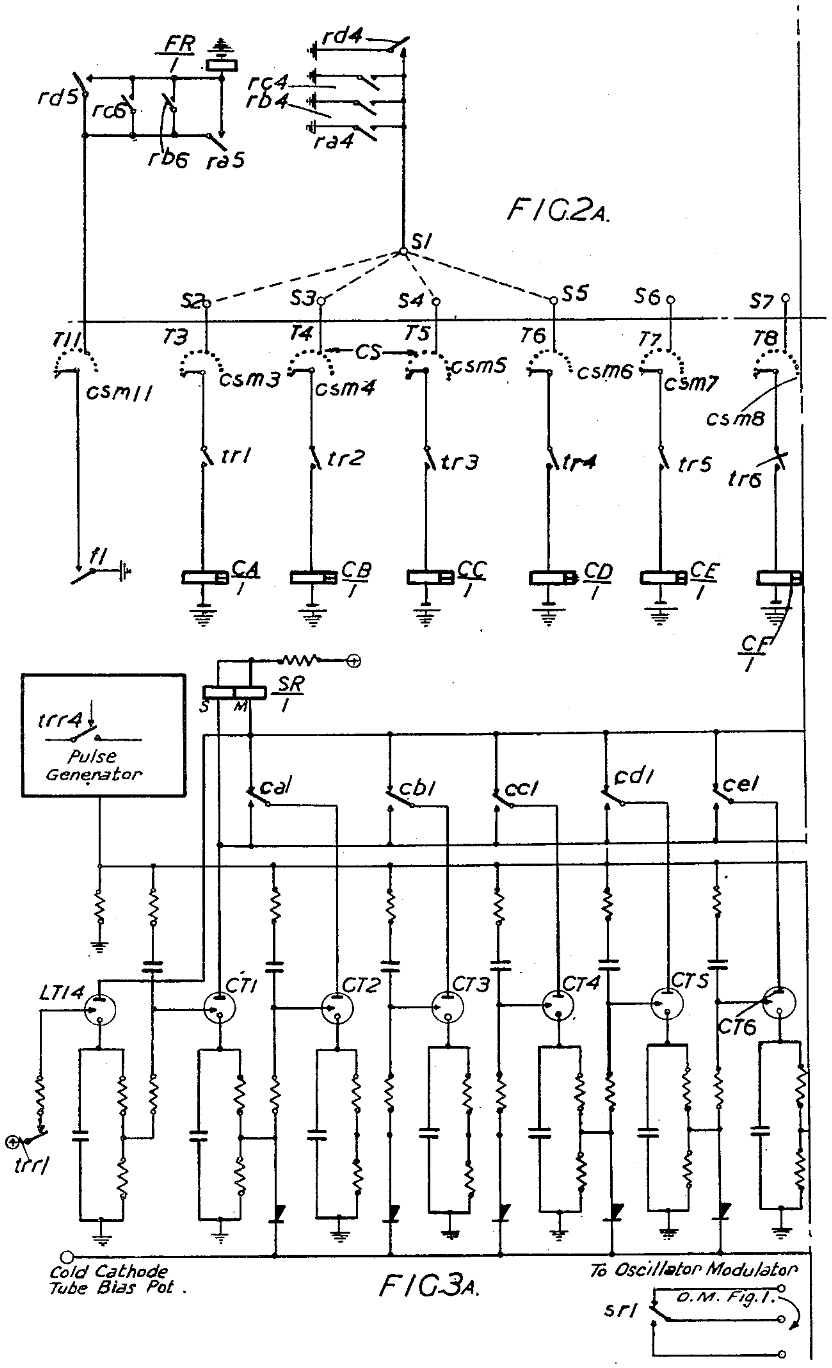
Figures 2B, 3B:
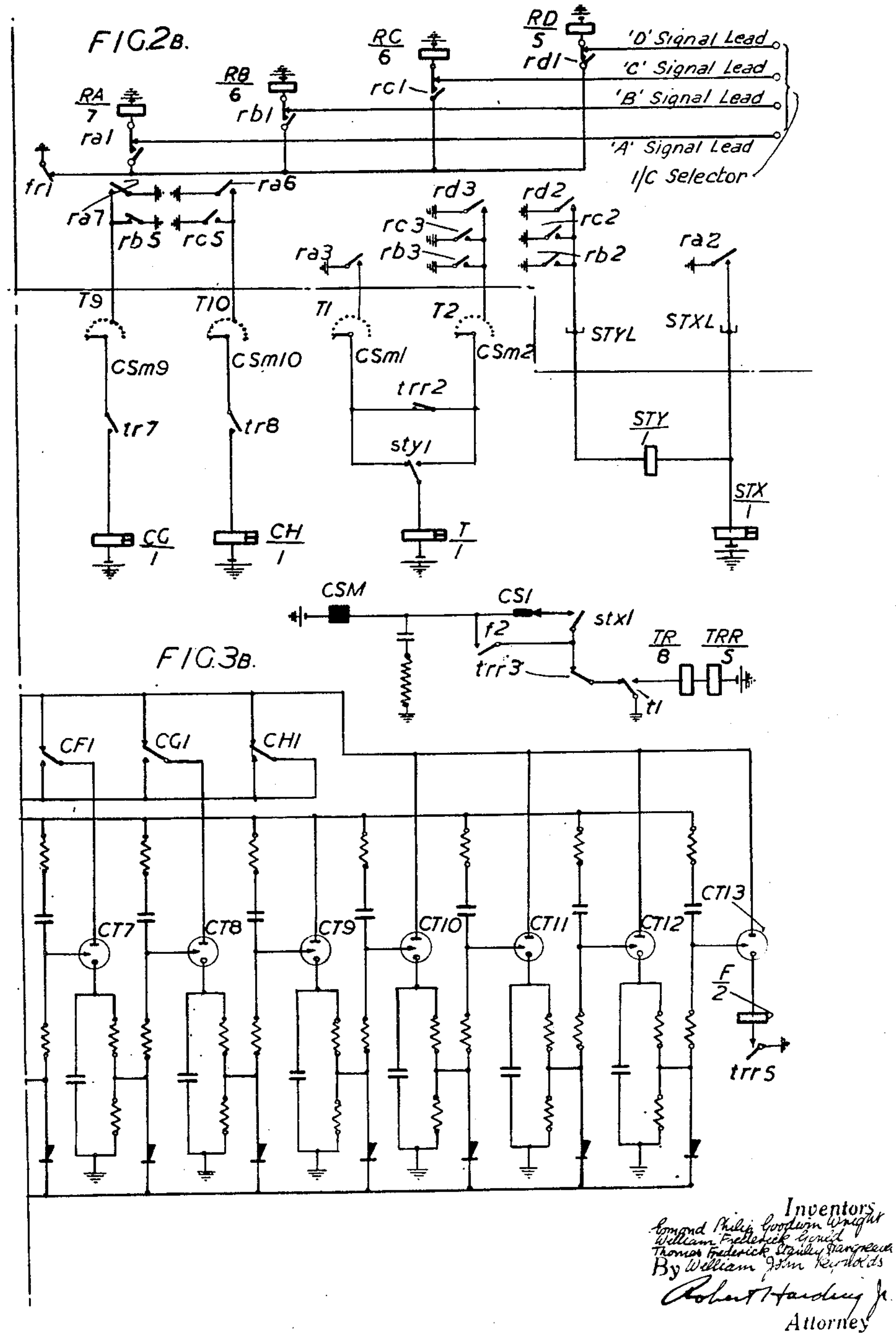

It has been assumed for the purpose of explanation that the identification code for a particular channel or incoming relay set IRS is SSSSMM. The complete code to be sent out for an "A" signal including starting space and finishing marks is therefor S.SSSSMM.SS.MM. Terminal S1 in the incoming relay set IRS Fig. 2A is strapped to those of the terminals S2—S7 corresponding to spaces in the identification code. For SSSSMM, the terminal S1 is strapped to S2, S3, S4 and S5. In detail the operation of the sender is as follows:

*Sending "A" signal.*—When the sender is required to transmit an "A" signal, earth is applied to the "A," Fig. 2B, signal lead in the incoming relay set to operate relay RA which locks to contacts *fr1*. Contacts *ra2* extend earth to the sender over one of two common start leads STXL, STYL to operate relay STX only since STY is as yet disconnected from ground. Contacts *ra3* provide a marking earth via terminals T1 for the switch CS.

The operation of relay STX closes the circuit for the magnet CSM of switch CS through *stx1*. The switch drives over its interrupters until the high speed relay T operates to the earth from *ra3* via *csm1*, *sty1* back contact. Relays TR and TRR operate through make contact *t1*. A selection of the high speed relays CA—CF operate depending on the strapping of terminals S2—S7 in the incoming relay set Fig. 2A. Relays CG and CH (Fig. 2B) operate via terminals T9, T10, make contacts *tr7* and *tr8* of relay TR, and ground provided by contacts *ra6* and *ra7*, for the code SS appropriate to an "A" signal. CG only would be operated for signal B (*rb5*), CH only for signal C (*rc5*), and neither CG nor CH for signal D, because of the arrangement of contacts associated with the incoming relay sets RA to RD in the CG and CH leads.

Tube LT14, Fig. 3A, is normally operating due to a triggering circuit via *trr1*, back contact and the sending relay SR is operated in the discharge circuit through its mark winding M. When TRR operates, Fig. 2B, contact *Trr4*, Fig. 3A, starts a pulse generator of any known type and the first pulse triggers CT1, LT14 consequently deionising as described in the U. S. Patent 2,421,005, to Bray et al., which issued on May 27, 1947. Sending relay SR hence changes to space, and its contacts *sr1* send a space signal to the oscillator modulator OM, Fig. 1. The second pulse triggers CT2 and CT1 deionises. Since the first unit of the code is to be a space, relay CA is operated, Fig. 2A, and the anode of tube CT2 switched to the space winding of relay SR via make contact *ca1*. The relay SR hence remains at space and the second unit is sent out. The second unit of the identification code, that is the third unit of the complete signal, is also a space, hence relay CB is operated and tube CT3 is switched to the space winding of relay SR. The third pulse from the generator triggers tube CT3 and the sending relay SR remains at space. The complete identification code is sent out in this way as the cold cathode tube counting chain responds to the generator pulses, the last two units being mark due to non-operation of relays CE, CF. The "A" signal (SS) follows since relays CG and CH (Fig. 2B) are operated from *ra6* and *ra7*. Tubes CT10, CT11, and CT12 (Fig. 3B), are connected to the mark winding of relay SR to provide finishing marks, although only two are required by the receiver. This ensures that differences between the time bases in the sender and receiver are not cumulative with continuous signalling conditions, and do not therefore introduce timing errors. Tube CT13 has in its discharge path relay F and triggers to the last pulse, thereby operating relay F. Contact *f1*, Fig. 2A, extends earth via wiper *csm11*, terminal T11, *ra5* to indicate the end of sending by operating relay FR. Contact *fr1* disconnects relay RA which in turn releases relay T in the sender (Fig. 2B). Relays TR, TRR and eventually F release due to opening of contact *t1* front. The sender is now ready to send another signal.

*Sending B, C and D signals.*—These signals are sent by operation of relays RB, RC, and RD, Fig. 2B. Relays CG and CH are operated from contacts of RB, and RC respectively, according to the signal code. The operation is otherwise similar to the "A" signal case, with the exception that relay STY is operated in addition to relay STX, and testing takes place over wiper *csm2* instead of wiper *csm1*.

It should be noted that the "A" signal is given preference over the B, C, and D signals. Assume the sender to be hunting for an incoming relay set requiring to send a "B" signal, then relays STX and STY will be operated. If now, a second relay set requires to send an "A" signal, earth is extended to the STX lead, short circuiting relay STY which releases and via its back contact *sty1* switches the sender test relay T to the bank *csm1* of the switch. Relay T can therefore only operate to an earth from an RA contact.

Transmitters of the type described in the U. S. application of McWhirter et al. Serial No. 744,010, filed April 25, 1947, could be used.

Figure 4A:
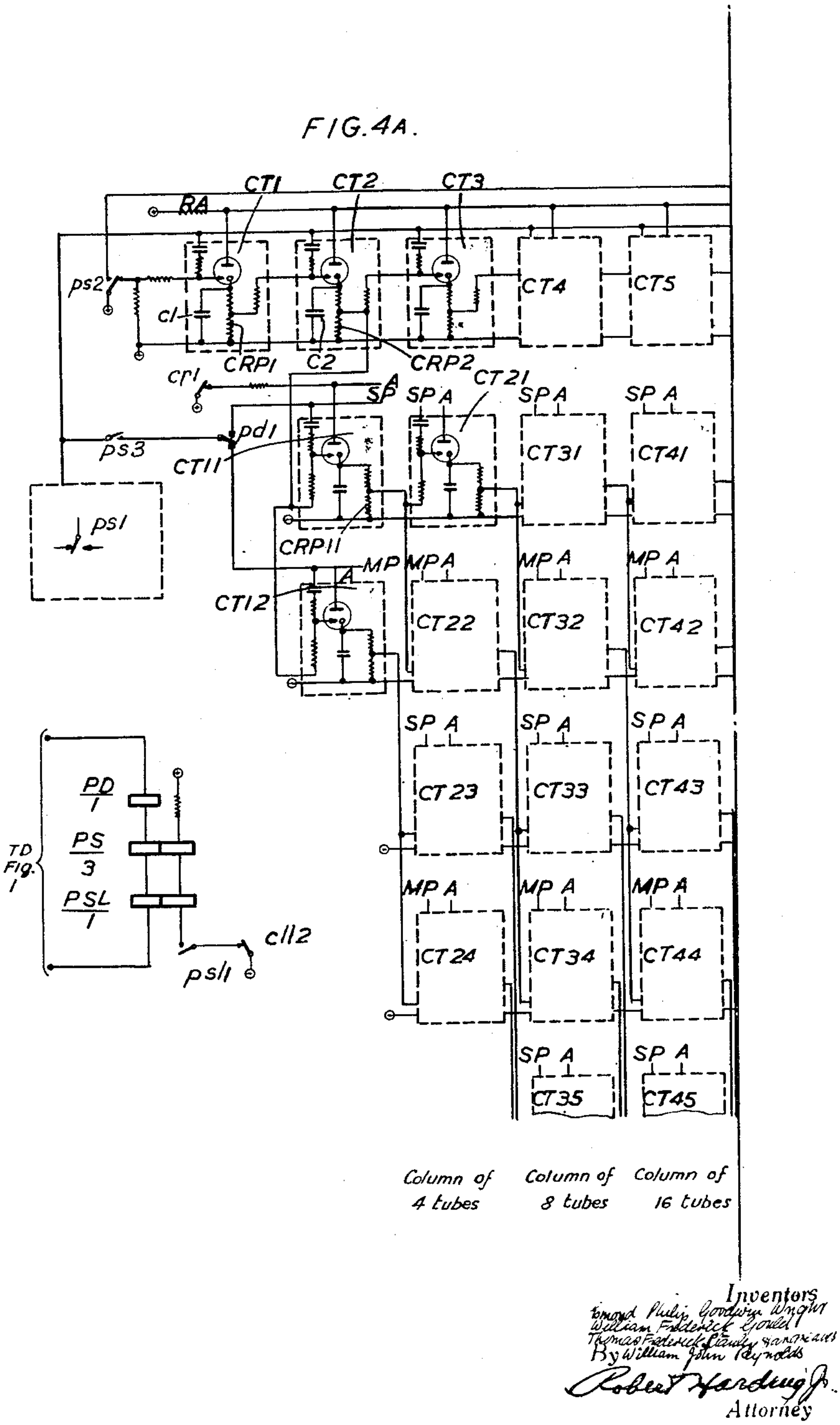
Figure 4B:
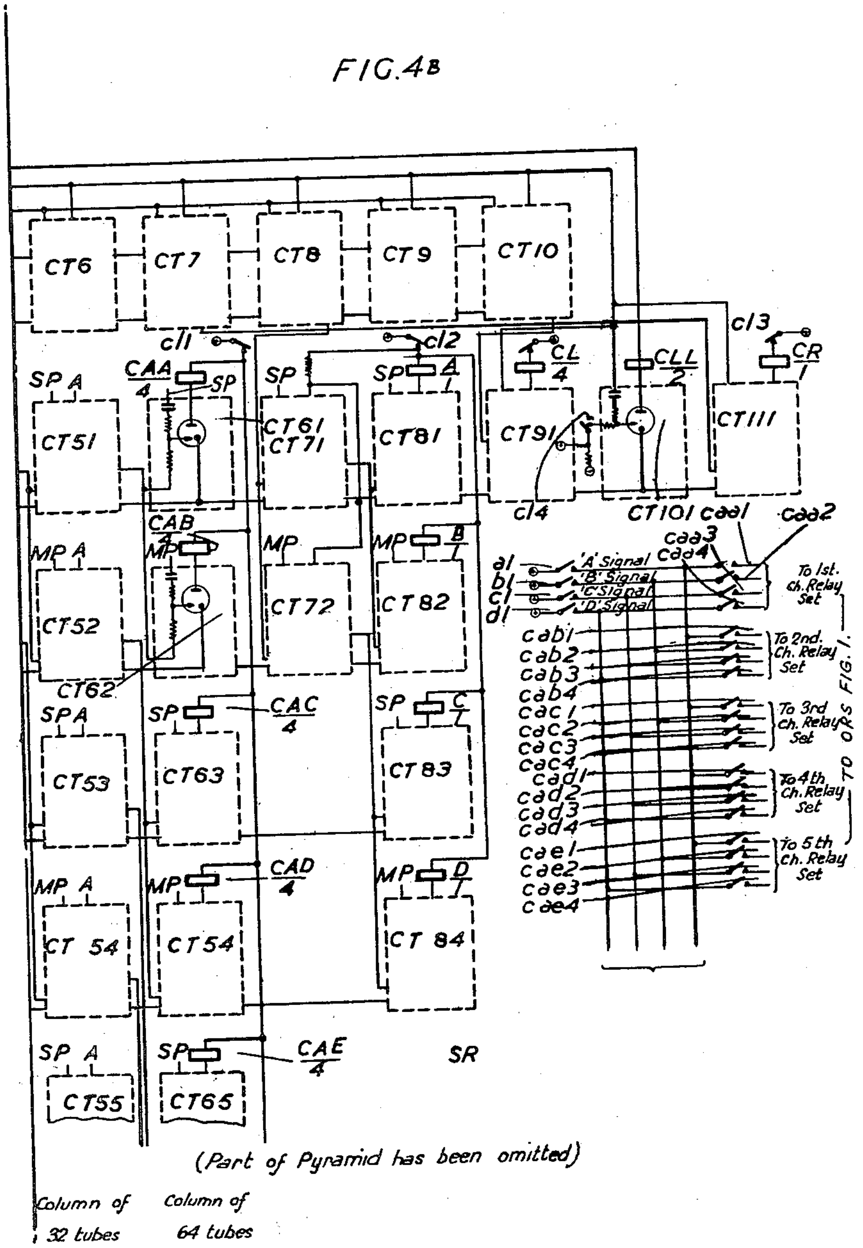

The signal receiver shown in Figs. 4A and 4B is similar to that described in the U. S. application Serial No. 744,010, mentioned above, and uses a pyramid of cold cathode tubes for the selection of one of a number of relays in response to one of a number of teleprinter codes. Two pyramids are used, a large one for channel identification comprising six stages of cold cathode tubes (Fig. 4A) CT11, CT12; CT21—CT24; CT31—CT38; CT61—CT124; and a small one for signal selection comprising two stages (Fig. 4B) CT71, CT72; CT81, CT84. A set of sequence control tubes CT1—CT10 is provided and also circuit control tubes CT91, CT101 and CT111. Tube CT1 is normally triggered via contacts *ps2* and is in discharging condition.

The reception of the code S.SSSSMM.SS.MM sent by the transmitter to the receiver, Figs. 4A and 4B, will now be described. The demodulated teleprinter signals are received by relays PD, PS, PSL from TD, Fig. 1. The first space signal operates the three relays and PS, PSL lock via *psl1*, *cll2*. PD is a polarized relay. Contacts *ps1* start up a pulse generator of any known type. Contacts *ps2* remove the triggering potential from CT1 which however, maintains its discharge. Contacts *ps3* close a triggering circuit for the identification pyramid. The pulses from the generator are in synchronism with the teleprinter signals but about midway between them. The first pulse between the first and second teleprinter units triggers CT2 which has been primed by the potential across the cathode resistance CRP1 as described in the U. S. Patent No. 2,421,005 of Bray et al. Tube CT1 is extinguished by the increase in potential across the common anode resistance RA while condenser C2 is charging and the consequent reduction in potential across CT1 as described in the above patent. This pulse does not operate the pyramid tubes since they are not primed.

The eventual potential across CRP2 primes CT3, CT11 and CT12. The second teleprinter unit, which is the first of the identification units, holds PD operated so that the second pulse from the genertaor is applied to CT3 and CT11 which discharge, CT2 being extinguished. The next three space units cause CT21, CT31 and CT41 to be operated, while the succeeding two mark units which cause PD to change over tubes CT52 and CT64 respectively. Tube CT8 is operated with CT64. Relay CAD operates in the CT64 circuit. The seventh pulse from the generator corresponding to the last identification code unit also operates CT111 in parallel with CT8, CT111 having been primed by CT7. Relay CR operates in series with CT111 and disconnects the pulsing circuit from the identification pyramid. The signal space units operate tubes CT71, CT81 together with relay A, tubes CT9 and CT10 also operating in turn.

Battery is now connected via *a1*, *cad1* to the A signal lead to the outgoing relay set identified by the code received.

Tube CT10 primes tube CT91 so that the tenth generator pulse operates CT91 and relay CL which releases the operated identification and signal relays at *cl1*, *cl2* and relay CR at *cl3*. Contacts *cl4* prime tube CT101 so that the eleventh pulse operates CT101 and relay CLL which releases CL, PS and PSL and contacts *ps2* release CT101 and relay CLL tube T1 reoperates, and the circuit is now back at normal.

It will be obvious that other identification codes will cause the operation of other of the 64 tubes in the last row of the identification pyramid and their relays, while "B," "C" or "D" signal codes will result in the operation respectively of relay B, C or D, the relevant signal lead to the ORS corresponding to the identification relay operated being thus connected to positive potential.

Instead of using the outgoing release signal consisting of a pulse of voice frequency of fixed length, this signal will be applied at the outgoing end and maintained until a release acknowledge signal is received from the ionising end on the signal channel indicating that the selector train is released. An additional incoming signal is not needed for this purpose since circuit conditions will permit the same signal as is used for "Proceed to Dial" to be used. It will be desirable to make the release signal a minimum duration of about 1 second in order to cover simultaneous clearing at both ends in which case the incoming clear signal might be interpreted as the release acknowledge signal.

It is also possible for all signals, except dialling if desired, to be passed over the signal channel. The principles of the common channel are unaltered since each signal channel will serve for outgoing signals for calls in one direction and incoming signals for calls in the other direction.

This arrangement permits the use of a very simple V. F. digit receiver on the speech channel which is disabled except during selection. Alternatively if key sending is required, relatively expensive V. F. digit receivers can be arranged common to a group of channels. The invention could also be used to give C. B. signalling on an installation which could be extended to dialling at a later date by the addition of the V. F. digit receivers.

Typical signal frequency generating transmitting and receiving circuits will now be described.

Figure 5:
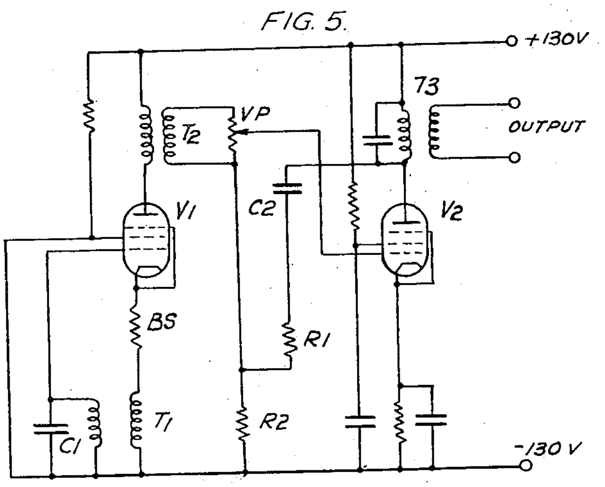

The V. F. oscillator shown in Fig. 5 is designed to produce a 750 C. P. S. tone of constant output voltage, two pentode valves being employed.

The first valve V1 is the oscillator proper and the requisite positive feed-back is derived from the cathode circuit by means of a transformer T1 properly phased. One winding of the transformer is in the cathode circuit, in series with the automatic bias resistor BS, and the second winding, tuned by a condenser C1 in shunt to give the operating frequency, is connected to the control grid of the valve. Grid bias is conveyed by the second winding.

The anode is transformer coupled to the second stage (output stage) and input control thereto is provided by means of a variable potentiometer VP across the secondary of the transformer T2, the tapping of the potentiometer being connected to the control grid of valve V2, and the bottom end being connected into the negative feed-back circuit of the second valve.

The output stage V2 is provided with a transformer output, the primary (anode) winding of the transformer T3 being tuned as an anti-resonant circuit to the operating frequency. Negative (voltage) feed-back is derived from the anode of valve V2 via the series blocking condenser C2 and the two series resistances R1, R2 forming a potentiometer, the feed-back voltage being applied to the grid of the second valve V2 via the second stage input potentiometer Vp. The effect of this voltage feed-back is to reduce the effective anode impedance of the output valve thereby providing a reasonably constant source of output voltage substantially independent of the load.

Current feed-back in the second valve is suppressed by adequate decoupling in the cathode circuit, since this feed-back would tend to increase the anode impedance.

Screen grid and suppressor grid circuits are as usual for a pentode valve.

Figure 6:
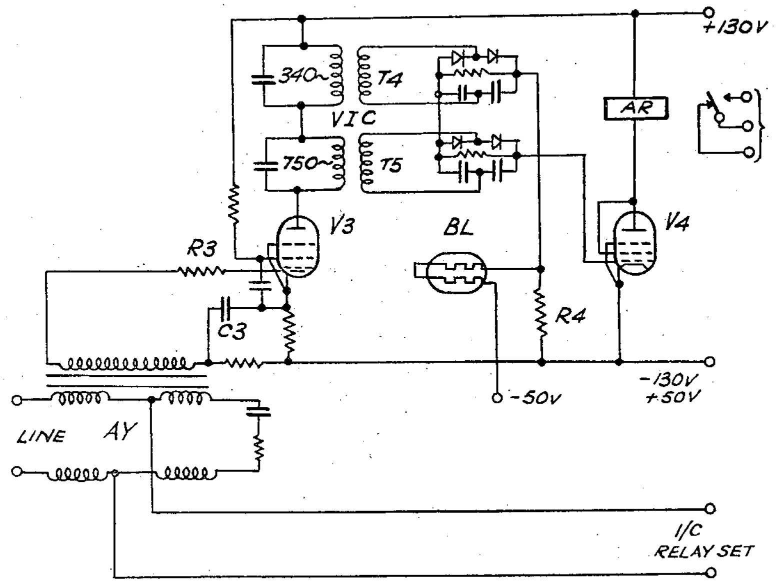

A. V. F. receiver, Fig. 6, will now be described.

Voice frequency received from the line divides in the balanced skew hybrid circuit AY shown, and is fed unequally to the incoming I/C relay set, and to the V. F. amplifier.

The loss to the I/C relay set is only about ¼ db., and the transmission thereto is substantially independent of frequency or termination.

The loss to the V. F. amplifier is about 10 db. The hybrid balancing network is suitably reactive (capacitive).

The V. F. receiver proper, is provided with an amplifier valve V3 and voice immunity circuits VIC, and a relay-operating valve V4, heavily back-biased in the absence of true signalling frequency of 750 C. P. S.

The output from the hybrid network going to the V. F. receiver is fed to the grid of the first valve V3 via a resistance R3, and to the cathode via a 0.1 micro-farads condenser C3, the remainder of the cathode circuit resistors being for developing normal grid bias and applying it via a high (grid leak) resistance to the valve V3.

The anode of the valve is in series connection with two transformers T4, T5, the primaries of which are in series, one T4 being tuned for 750 C. P. S. (wanted frequency) and the other for 340 C. P. S. representing the most likely voice disturbing frequency.

The secondaries of these two transformers are separately connected to conventional voltage doubler circuits connected in series-voltage opposition, the free output of the 750 C. P. S. doubler being connected to the control grid of the second valve V4 and the free output of the 340 C. P. S. doubler being connected to a counter-bias circuit for valve V4.

The counter-bias circuit consists of a resistor R4 across which voltage is developed, in series with a ballast lamp BL and fed from a negative 50 v. battery, so that the normal counter-bias developed across the resistor is 20 v. negative; this is applied to the grid of the valve 24 via the two loads of the voltage doublers in series, thereby inhibiting anode current in this valve in the absence of signals, and preventing the operation of a relay AR which is in series connection with the anode circuit of said valve. The relay AR controls the operation of the succeeding incoming relay set.

When pure signal of 750 C. P. S. is received at adequate strength, its effect is to produce a rectified voltage in the voltage doubler associated with the 750 C. P. S. output transformer, and this is in a direction to cancel the normal counter-bias of the second valve V4, which therefore commences to pass anode current, and operates the relay AR.

If pure signal of 340 C. P. S. is received (a spurious signal) the corresponding voltage doubler gives output, but the voltage derived is in a direction to reinforce the counter-bias and the valve remains quiescent.

If spurious (complex) voice signals are received, the output from either or both voltage doublers together will be less than for pure frequencies of the same power level, and will tend to cancel one another and so fail to oppose adequately the valve disabling bias.

Figure 7:
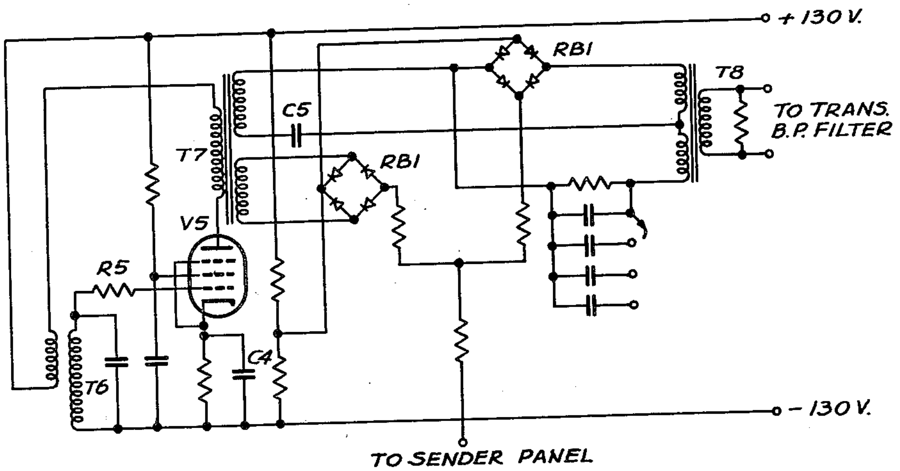

Oscillator modulator, Fig. 7, provides carrier of 3300 C. P. S. for the signal channel, and also carries out modulation of this carrier in accordance with signals from the sender panel.

The primaries of oscillator transformers T7, T6 are in series. The oscillator transformer T6 is a two winding one with its secondary tuned for 3300 C. P. S. and connected to the grid of the valve V5 via a resistor R5, and to the cathode via the decoupling condenser C4 of the auto-bias circuit. Energy is fed from the anode of valve V5 to the grid thereof in proper phase over the serially connected primary windings of transformers T6 and T7.

The output transformer T7 has two secondaries; one of these is fed to a full-wave rectifier bridge RB1 in shunt with it; the other is fed to an output transformer T8 for the modulated signals via a full-wave bridge rectifier RB2 in series with a condenser C5. The two rectifiers RB1 and RB2 are so biassed by means of a "bleeder" across the H. T. supply, that for normal sender conditions (E received from the sender) the shunt bridge RB1 is a high resistance (non-conducting) while the series bridge RB2 is conducting and permits the 3300 C. P. S. to be normally transmitted.

When the sender panel returns +130 v. (the alternative condition) to the oscillator modulator, the bias conditions on the rectifiers are reversed, the shunt one RB1 now becoming effectively a short circuit across the oscillator outputs and the series one RB2 non-conducting in the direction of the transmission. The output of 3300 C. P. S. is therefore suppressed. This provides for mark and space conditions.

Figure 8:
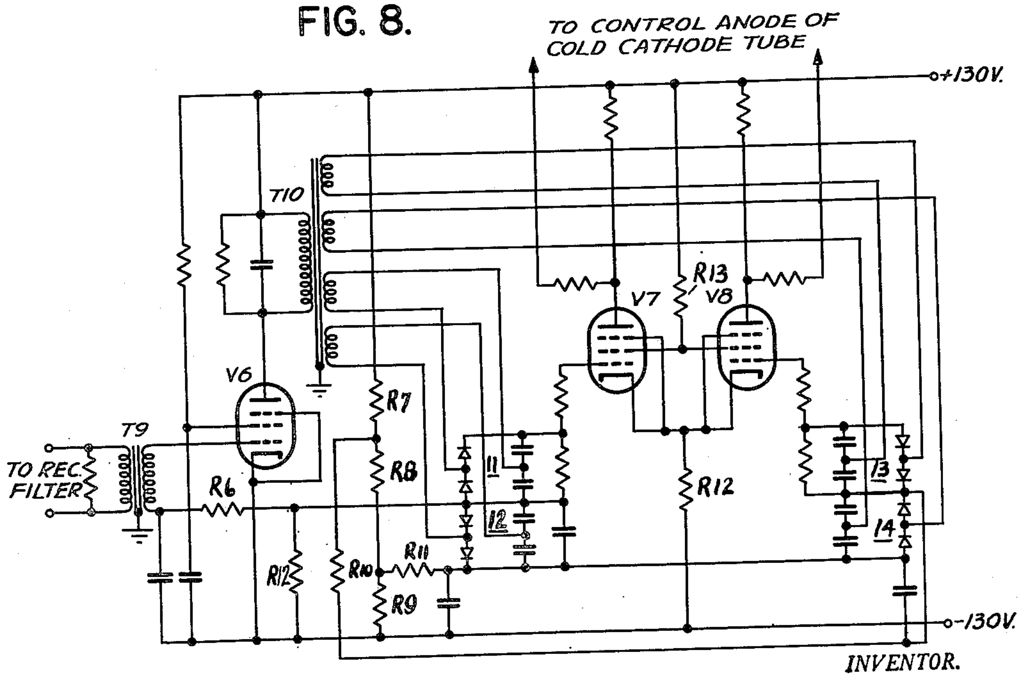
Fig. 8 shows the incoming signal detector.

The signal detector, Fig. 8, consists firstly of an amplifying valve V6 for receiving the normally transmitted 3300 C. P. S. signal frequency.

The frequency is received on a terminated input transformer T9, the secondary of which is connected to the control grid of the valve V6. Grid bias is derived from an A. V. C. circuit, and conveyed over a grid leak 10.

The amplifier output is taken via a tuned output transformer T10 tuned for 3300 C. P. S., to four separate, similar outputs. These are fed to four voltage doubler circuits designated generally as 11, 12, 13 and 14, arranged in 2 pairs in series opposition, one pair 11 and 12 being in series opposition one way around (negatives connected) and the other pair in series opposition the other way around (positives connected) and bias of $+3^v$ and $+6^v$ derived from an H. T.

bleeder consisting of resistances R7, R8 and R9 shunted across the high tension voltage supply and is fed to the two pairs of doublers so that one doubler in each pair 12 and 14 is delayed 3v, the other ones of the pairs 11 and 13 being instantaneous in their action. This is a system of delayed A. V. C. and the potentials derived are used to control two further pentode valves V7, V8, the valve V7 being biassed to cut-off and the valve V8 conducting, in the absence of received signals.

When the signal is modulated, the voltage doublers cause the bias conditions to be reversed, and the valves reverse their functions, the valve V8 now being rendered non-conducting, and the valve V7 now being rendered conducting.

The anode circuits of these valves are taken to cold cathode tubes or telegraph relays associated with relay sets, and the relays are operated or the tubes fired according to the condition of the respective anode circuits.

What is claimed is:

1. A carrier telephone system comprising a first station, a second station, a plurality of first speech channels between said stations, a plurality of second speech channels between said stations, a signal channel included in and being common to respective speech channels of said first and second pluralities, transmitting and receiving means at each of said first and second stations being connectable to respective first and second speech channels and to said signal channels, said transmitting means being operative to simultaneously transmit signals including a speech channel identity signal over said signal channels and means connected to said receiving means at said first and second stations being operative to allocate signals to respective first and second speech channels in accordance with said speech channel identity signals.

2. The carrier telephone system as set forth in claim 1, wherein said transmitting means at said first and second stations are operative to transmit signals over said signal channels in a direction opposite to the transmission in said speech channels.

3. A carrier telephone system comprising a first station, a second station, a plurality of outgoing speech channels at said first station, a plurality of incoming speech channels at said first station, a plurality of outgoing and incoming speech channels at said second station, a common link circuit connecting the outgoing speech channels at said first station to the incoming speech channels at said second station and said incoming speech channels at said first station to said outgoing speech channels at said second station, an outgoing signal channel at said first station connected incoming to said second station, and incoming signal channel at said first station connected outgoing from said second station, means for transmitting signals including an incoming speech channel identity signal over said outgoing signalling channel at said first station and means for transmitting signals including an outgoing speech channel identity signal over said incoming signalling channel at said first station.

4. A carrier telephone system comprising a first station, a second station, a plurality of first speech channels between said stations, a plurality of second speech channels between said stations, first and second signalling channels included in and being common to said first and second pluralities of speech channels, transmitting and receiving means at said first and second stations operative respectively to transmit and receive signals including a channel identity designation signal, means for connecting said first signalling channel to said first station for transmission of said signals including an identifying signal of a first speech channel and to said second station for transmission of said signals including an identifying signal of a second speech channel and means for connecting said second signalling channel to said second station for transmission of said signals including an identifying signal of a second speech channel and to said first station for transmission of said signals inclding an identifying signal of a first speech channel.

5. A carrier telephone system comprising a pair of stations, a plurality of first and second speech channels connected between said stations, means for dividing one each of said first and second speech channels into a signalling channel and a degraded speech channel, transmitting and receiving means at each of said stations selectively connectable to respective signalling and speech channels, means for operating said transmitting means at each station to transmit signals over respective signalling channels including a speech channel identity signal, and means including telegraph code responsive relays and controlled by said receiving means at each station for connecting respective speech channels in accordance with said speech channel identity signals.

6. The carrier telephone system as claimed in claim 5, wherein said first speech channels are connected for transmission in one direction between said stations and said second speech channels are connected for transmission in the opposite direction between said stations, means connecting the signalling channel derived from said first speech channel for signalling purposes commonly to said second speech channels and the signalling channel derived from said second speech channel being connected commonly to said first speech channels.

7. The carrier telephone system as claimed in claim 5, wherein said transmitting and receiving means are operative to transmit and receive coded signals characterizing respective speech channels.

8. A carrier telephone system comprising a pair of stations, a plurality of "outgoing" speech channels between said stations, a plurality of "incoming" speech channels between said stations, an "outgoing" signal channel common to all of said "incoming" speech channels, an "incoming" signal channel common to all of said "outgoing" speech channels, means for transmitting backward signals over said "outgoing" signal channel including an "incoming" speech channel identity signal, means for transmitting backward signals over said " incoming" signal channel including an "outgoing" speech channel identity signal and means at each of said stations for allocating speech channels in accordance with respective identity signals received.

ESMOND PHILIP GOODWIN WRIGHT.
WILLIAM FREDERICK GOULD.
THOMAS FREDERICK STANLEY HARGREAVES.
WILLIAM JOHN REYNOLDS.

(References on following page)

REFERENCES CITED

The following references are of record in the file of this patent:

UNITED STATES PATENTS

| Number | Name | Date |
|---|---|---|
| 1,557,079 | Morehouse | Oct. 13, 1925 |
| 1,862,587 | Almquist | June 14, 1932 |
| 2,155,176 | Wicks | Apr. 18, 1939 |
| 2,387,525 | Murray | Oct. 23, 1945 |
| 2,398,755 | Shepherd | Apr. 16, 1946 |

FOREIGN PATENTS

| Number | Country | Date |
|---|---|---|
| 489,609 | Great Britain | June 25, 1938 |